Aug. 26, 1947.  F. BOTTOMLEY  2,426,174
SEAL
Filed Aug. 22, 1944

INVENTOR
Frank Bottomley
BY Barlow & Barlow
ATTORNEYS

Patented Aug. 26, 1947

2,426,174

UNITED STATES PATENT OFFICE 2,426,174

SEAL

Frank Bottomley, Barrington, R. I., assignor to Sealol Corporation, a corporation of Rhode Island Application August 22, 1944, Serial No. 550,607

8 Claims. (Cl. 286—11)

This invention relates to a seal for relatively rotating members which have a relation to each other such as the inner and outer raceways of ball bearings.

The inner and outer raceways of ball bearings have been recessed so as to provide a pocket to retain some sealing means therein. In many cases, however, a considerable depth of pocket is required as the seals which are provided have considerable axial extent. This arrangement makes the relatively rotating members of ball bearing units large and clumsy and requires a greater space for the same to be mounted in.

One of the objects of this invention is to provide a seal for relatively rotating members such as are found in ball bearing raceways whereby the axial extent of the seal may be reduced to a minimum and the entire unit may be made much smaller than heretofore.

Another object of the invention is to provide for a more accurate and better control of the pressures which will be applied on the members which provide the seal.

With these and other objects in view, the invention consists of certain novel features of construction, as will be more fully described and particularly pointed out in the appended claims.

Figure 1:
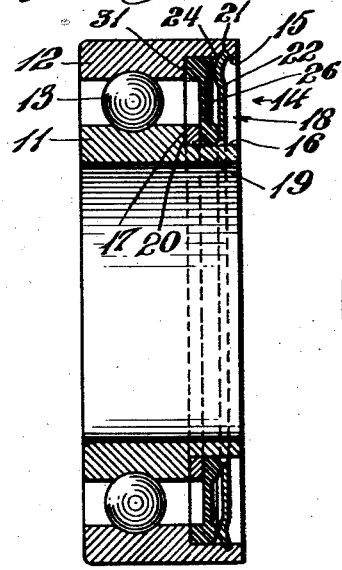
Fig. 1 is a sectional view illustrating my seal as mounted in a ball bearing unit.
Figure 2:
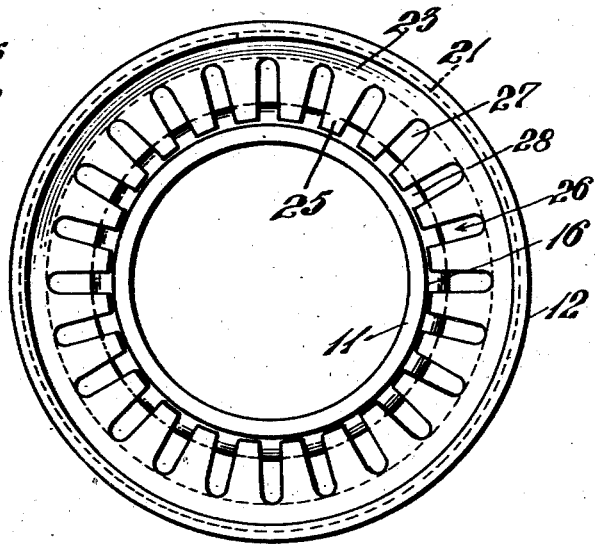
Fig. 2 is an end view of the unit shown in Fig. 1.

In proceeding with this invention I provide projections on a diaphragm of rubber-like material for localized engagement with the pressure-applying ring whereby I am enabled to direct the face pressure desired. The pressure applying washer may be deflected so as to assist in this control which deflection also serves to stiffen the washer for the application of a greater amount of pressure or the utilization of thinner material.

With reference to the drawing 10 designates generally a ball bearing unit which has an inner raceway 11 and an outer raceway 12 with the balls 13 between the two. A recess 14 is provided by notching a portion 15 of the outer raceway 12 and a portion 16 of the inner raceway 11. A sealing face 17 is provided on the inner raceway member by means of a radially extending surface at the end of the cut-out portion 16. A sealing unit designated generally 18 is located in this recess 14 and comprises three members.

There is a sealing ring 19 which has a surface 20 ground to match the surface 17 so as to fit snugly thereagainst and form a seal therewith. This ring 19 may be made of any suitable material but likely will be chosen from some plastic or carbon for this purpose.

A notch 21 is provided in the cut-out portion 15 of the outer raceway 12 and in this notch is located a pressure-applying disc member 22 which comprises a solid ring portion 23 deflected as at 24 inwardly toward the diaphragm to be engaged and provided with a plurality of fingers 25 extending radially toward the inner raceway member 11. The peripheral portion 23 extends into the groove and is locked in this position.

Figure 3:
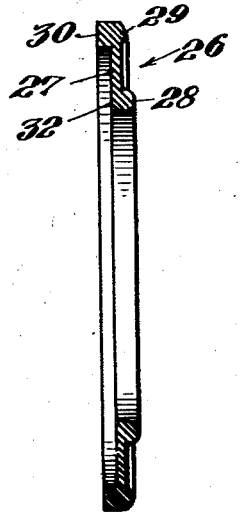
Fig. 3 is a sectional view of the diaphragm member alone.

A rubber-like diaphragm member 26, shown by itself in Fig. 3, is provided with a radially extending portion 27, an axially extending projection 28 at one edge thereof and an axially extending projection 29 on the same side adjacent the other edge thereof. The outer edge of the diaphragm is thickened as at 30 so as to engage the shoulder 31 of the cut away portion 15 of the outer raceway 12. The diaphragm 26 is located between the members 19 and 22 and, as shown in Fig. 1, the portion 30 engages the shoulder 31 and is pressed against this shoulder by the deflected portion of the ring disc 22 while at its inner edge the sealing member 19 engages the face portion 32 of the diaphragm and is bonded thereto. The projection 28 is engaged by the inner ends of the fingers 25 so as to press this inner periphery of the diaphragm which carries the sealing ring toward the sealing faces 20 and 17 that they may tightly engage and prevent any fluid which may be contained within the casing where the ball bearing is mounted from moving outwardly through the ball rings.

Figure 4:
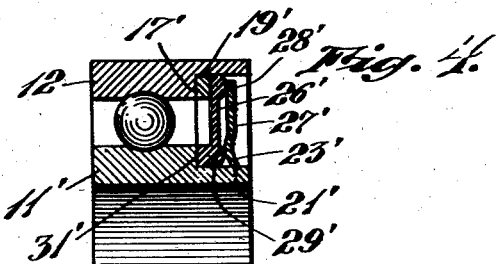
Fig. 4 is a sectional view similar to Fig. 1 but illustrating the seal as applied in reverse relation.
Figure 5:
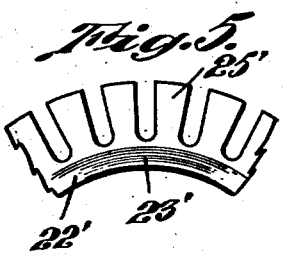
Fig. 5 is a fragmental end view of the outer member of the sealing means of the modification shown in Fig. 4.

In some cases the inverse relation of the part shown in Fig. 1 may be desired and in Fig. 4 I have provided a sealing face 17' on the outer member 12 to be engaged by a ring 19' while the ring member 22' has its continuous edge 23' along its inner edge with arms 25' extending radially outwardly therefrom. In this case the groove 21' is provided in the inner raceway member 11' to receive the portion 23' of the pressure applying disc. The rubber-like diaphragm 26' is provided with axial projections 28' and 29', the latter to be engaged by the deflected portion 23' while the fingers 25' engage the projecting portion 28' to apply pressure thereon. The sealing member 19' may apply pressure on the sealing face sufficiently to maintain a seal between the parts.

By reason of the projection on the diaphragm and deflected portion of the pressure applying disc pressure may be localized to be directed along the axial direction desired and at the radial distance desired that a most efficient result may be obtained.

I claim:

1. In a fluid sealing device for relatively rotating parts, one of said parts having a holding groove and the other a sealing face in a plane at right angles to the axis of rotation, a member engaging said holding groove and extending radially from that part toward the other part, and a member of rubber-like material radially disposed between said parts having a sealing surface on one side thereof to engage said sealing face and provided with projections on the opposite side thereof and extending axially toward the other member to provide localized points of engagement with the other member, one of said projections being in axial alignment with the sealing face and the other adjacent said groove.

2. In a fluid sealing device for relatively rotating parts, one of said parts having a holding groove and the other a sealing face in a plane at right angles to the axis of rotation; the combination of three members, one member providing a sealing surface to abut the said sealing face, and axially movable with relation thereto, the second member engaging said holding groove and extending radially from that part toward the other part, and a third member of rubber-like material radially disposed between the first and second members and provided with projections extending axially toward the second member to provide localized points of engagement with said second member, one of said points of engagement being in axial alignment with the sealing face and the other point of engagement being adjacent said groove.

3. In a fluid sealing device for relatively rotating parts, one of said parts having a holding groove and the other a sealing face in a plane at right angles to the axis of rotation; the combination of three members, one member providing a sealing surface to abut the said sealing face, and axially movable with relation thereto, the second member engaging said holding groove and extending radially from that part toward the other part, and a third member of rubber-like material radially disposed between the first and second members and provided with projections extending axially toward the second member to provide localized points of engagement with said second member, one point of engagement being in axial alignment with the said sealing face.

4. In a fluid sealing device for relatively rotating parts, one of said parts having a holding groove and the other a sealing face in a plane at right angles to the axis of rotation; the combination of three members, one member providing a sealing surface to abut the said sealing face, and axially movable with relation thereto, the second member engaging said holding groove and extending radially from that part toward the other part, and a third member of rubber-like material radially disposed between the first and second members and provided with projections extending axially toward the second member to provide localized points of engagement with said second member, one point of engagement being in axial alignment with the said sealing face and the other point of engagement being adjacent said groove.

5. In a fluid sealing device for relatively rotating parts, one of said parts having a holding groove and the other a sealing face in a plane at right angles to the axis of rotation; the combination of three members, one member providing a sealing surface to abut the said sealing face, and axially movable with relation thereto, the second member engaging said holding groove and extending radially from that part toward the other part, and a third member of rubber-like material radially disposed between the first and second members and provided with projections extending axially toward the second member to provide localized points of engagement with said second member, one point of engagement being in axial alignment with the sealing face and the other point of engagement being adjacent said groove, said second member being deflected towards the projection adjacent to said holding groove.

6. In a fluid sealing device for relatively rotating parts, one of said parts having a holding groove and the other a sealing face in a plane at right angles to the axis of rotation; the combination of three members, one member providing a sealing surface to abut the said sealing face, and axially movable with relation thereto, the second member engaging said holding groove and extending radially from that part toward the other part, and a third member of rubber-like material radially disposed between the first and second members and provided with projections extending axially toward the second member to provide localized points of engagement with said second member, one point of engagement being in axial alignment with the said sealing face and the other point of engagement being adjacent said groove, said second member being deflected to stiffen the same adjacent its connection to said holding groove and in a radial position to be engaged by the projection on said third member.

7. In a fluid sealing device for relatively rotating parts, one of said parts having a holding groove and the other a sealing face in a plane at right angles to the axis of rotation; the combination of three members, one member providing a sealing surface to abut the said sealing face, and axially movable with relation thereto, the second member engaging said holding groove and extending radially from that part toward the other part, and a third member of rubber-like material radially disposed between the first and second members and provided with projections extending axially toward the second member to provide localized points of engagement with said second member, one point of engagement being in axial alignment with the sealing face and the other point of engagement being adjacent said groove, said first and third members being bonded together to be handled as a single unit.

8. In a fluid sealing device for relatively rotating parts, one of said parts having a holding groove and the other a sealing face in a plane at right angles to the axis of rotation; the combination of three members, one member providing a sealing surface to abut the said sealing face, and axially movable with relation thereto, the second member engaging said holding groove and having spaced arms extending radially from that part toward the other part, and a third member of rubber-like material radially disposed between the first and second members and provided with projections extending axially toward the second member to provide localized points of engagement with said second member, one point of engagement being in axial alignment with the sealing face and the other point of engagement being adjacent said groove.

FRANK BOTTOMLEY.

REFERENCES CITED

The following references are of record in the file of this patent:

UNITED STATES PATENTS

| Number | Name | Date |
|---|---|---|
| 2,221,553 | Okun | Nov. 12, 1940 |
| 2,221,554 | Okun | Nov. 12, 1940 |
| 2,308,114 | Schjolin | Jan. 12, 1943 |